United States Patent
Carlbom et al.

(10) Patent No.: US 9,709,673 B2
(45) Date of Patent: Jul. 18, 2017

(54) METHOD AND SYSTEM FOR RENDERING A SYNTHETIC APERTURE RADAR IMAGE

(71) Applicant: SAAB Vricon Systems AB, Linkoeping (SE)

(72) Inventors: Per Carlbom, Linkoeping (SE); Tomas Toss, Linkoeping (SE); Patrik Dammert, Goeteborg (SE); Leif Haglund, Brokind (SE)

(73) Assignee: Vricon Systems AB, Linkoeping (SE)

( * ) Notice: Subject to any disclaimer, the term of this patent is extended or adjusted under 35 U.S.C. 154(b) by 163 days.

(21) Appl. No.: 14/363,267

(22) PCT Filed: Apr. 14, 2014

(86) PCT No.: PCT/SE2014/050459
§ 371 (c)(1),
(2) Date: Jun. 5, 2014

(87) PCT Pub. No.: WO2015/160289
PCT Pub. Date: Oct. 22, 2015

(65) Prior Publication Data
US 2016/0259046 A1    Sep. 8, 2016

(51) Int. Cl.
*G01S 13/90* (2006.01)
*G06T 17/05* (2011.01)
(Continued)

(52) U.S. Cl.
CPC .......... *G01S 13/90* (2013.01); *G01S 13/9035* (2013.01); *G06T 17/05* (2013.01); *G01S 13/9094* (2013.01); *G06T 15/00* (2013.01); *G06T 15/20* (2013.01)

(58) Field of Classification Search
CPC ............................ G01S 13/90; G01S 13/9035
(Continued)

(56) References Cited

U.S. PATENT DOCUMENTS

| 4,645,459 A | * | 2/1987 | Graf | G06T 15/04 |
| | | | | 345/426 |
| 5,192,208 A | * | 3/1993 | Ferguson | G09B 9/006 |
| | | | | 342/169 |

(Continued)

FOREIGN PATENT DOCUMENTS

| CN | 103336272 A | 10/2013 |
| EP | 2390627 A1 | 11/2011 |
| WO | WO 2011/067713 A2 | 6/2011 |

OTHER PUBLICATIONS

Leidos, RADSIM Simulator 3.0, https://www.leidos.com/products/simulation/radsim3, Apr. 9, 2014, retrieved Nov. 17, 2016 from https://web.archive.org/web/20140309201012/http://www.leidos.com/products/simulation/radsim3#tab/overview.*

(Continued)

*Primary Examiner* — Peter Bythrow
(74) *Attorney, Agent, or Firm* — Alston & Bird LLP (57) ABSTRACT

The present disclosure relates to a method (100) for rendering a simulated Synthetic Aperture Radar, SAR, image. The method comprises providing (110) a digital surface model or the like comprising 3D coordinate data in a geo-referenced coordinate system, determining (120) a sub-section of the digital surface model, and obtaining (130) the simulated SAR image based on the subsection of the digital surface model, wherein substantially each point in the simulated SAR image being associated to a 3D coordinate in the geo-referenced coordinate system.

24 Claims, 5 Drawing Sheets

(51) Int. Cl.
*G06T 15/20* (2011.01)
*G06T 15/00* (2011.01)

(58) Field of Classification Search
USPC .................................................. 342/25 A
See application file for complete search history.

(56) References Cited

U.S. PATENT DOCUMENTS

| | | | | | |
|---|---|---|---|---|---|
| 5,353,030 | A | * | 10/1994 | Koch | G01C 11/00 342/169 |
| 5,546,084 | A | * | 8/1996 | Hindman | G01S 7/411 342/161 |
| 5,680,138 | A | * | 10/1997 | Pritt | G01S 7/4052 342/169 |
| 6,069,582 | A | * | 5/2000 | Nelander | G01S 7/4052 342/159 |
| 6,218,980 | B1 | * | 4/2001 | Goebel | G01C 21/165 342/64 |
| 7,583,275 | B2 | * | 9/2009 | Neumann | G06T 17/00 345/419 |
| 7,627,545 | B2 | * | 12/2009 | Asher | G06F 17/30241 706/52 |
| 8,242,948 | B1 | * | 8/2012 | Burky | G01S 13/9035 342/175 |
| 2007/0002040 | A1 | * | 1/2007 | Oldroyd | G01C 11/00 345/419 |
| 2007/0096945 | A1 | * | 5/2007 | Rasmussen | G01C 21/32 340/995.1 |
| 2007/0265781 | A1 | * | 11/2007 | Nemethy | G01C 7/02 702/5 |
| 2008/0140271 | A1 | * | 6/2008 | Garceau | G06T 7/001 701/10 |
| 2008/0143709 | A1 | * | 6/2008 | Fassero | G06T 3/00 345/419 |
| 2009/0019382 | A1 | * | 1/2009 | Ronish | G09B 9/30 715/764 |
| 2010/0118053 | A1 | * | 5/2010 | Karp | G01C 11/06 345/630 |
| 2010/0171756 | A1 | * | 7/2010 | Tosun | G01C 21/367 345/629 |
| 2010/0215250 | A1 | * | 8/2010 | Zhu | G06T 17/05 382/154 |
| 2011/0227556 | A1 | * | 9/2011 | Ivchenko | G01C 25/005 323/318 |
| 2011/0273451 | A1 | * | 11/2011 | Salemann | G06T 17/05 345/427 |
| 2012/0166146 | A1 | * | 6/2012 | Cincotti | F41J 11/00 703/1 |
| 2012/0179433 | A1 | * | 7/2012 | Wivell | G06T 17/05 703/2 |
| 2012/0320057 | A1 | * | 12/2012 | Gutierrez | G06T 17/05 345/427 |
| 2013/0293547 | A1 | * | 11/2013 | Du | G06T 15/06 345/426 |
| 2016/0019458 | A1 | * | 1/2016 | Kaufhold | G01S 7/417 342/25 F |

OTHER PUBLICATIONS

Liu, Hongxing, et al., "Correction of Positional Errors and Geometric Distortions in Topographic Maps and DEMs Using a Rigorous SAR Simulation Technique", Photogrammetric Engineering & Remote Sensing, Sep. 2004, pp. 1031-1042, vol. 70, No. 9, American Society for Photogrammetry and Remote Sensing, USA.*
Dr. George L. Bair; Airborne Radar Simulation; 1996; Camber Corporation, Dallas, Texas; pp. 1-16.*
International Searching Authority, International Search Report and Written Opinion for Internatioanl Application No. PCT/SE2014/050459, Jan. 29, 2015, 15 pages, Swedish Patent and Registration Office, Stockholm.
Growe, S., et al., "3D Visualization and Evaluation of Remote Sensing Data", Jun. 22, 1998, 11 pages, Retrieved from: <http://citeseerx.ist.psu.edu/viewdoc/downloadjsessionid=FF48CD145F8425FFD7B276954229191D?doi=10.1.1.45.1644&rep =rep1&type=pdf>.

* cited by examiner

METHOD AND SYSTEM FOR RENDERING A SYNTHETIC APERTURE RADAR IMAGE

CROSS REFERENCE TO RELATED APPLICATIONS

This application is a National Stage Application, filed under 35 U.S.C. §371, of International Application No. PCT/SE2014/050459, filed Apr. 14, 2014, the contents of which are hereby incorporated by reference in their entirety.

BACKGROUND

Related Field

The present disclosure relates to a method and system for rendering a Synthetic Aperture Radar image.

Description of Related Art

Synthetic-aperture radar, SAR, is a form of radar whose defining characteristic is its use of relative motion, between an antenna and its target region, to provide distinctive long-term coherent-signal variations, that are exploited to obtain finer spatial resolution than possible with conventional beam-scanning means.

SAR is usually implemented by mounting on a moving platform such as an aircraft or spacecraft, a single beam-forming antenna from which a target scene is repeatedly illuminated with pulses of radio waves. Echoes successfully received at the different antenna positions are coherently detected and stored. The stored echoes are then post-processed to resolve elements in an image of the target region.

SAR can also be implemented as "inverse SAR" by observing a moving target over time with a stationary antenna.

SAR's single physical antenna element gathers signals at different positions at different times. When the radar is carried by an aircraft or an orbiting vehicle, those positions are functions of a single variable, distance along the vehicle's path, which is a single mathematical dimension (not necessarily the same as a linear geometric dimension). The signals are stored, thus becoming functions, no longer of time, but of recording locations along that dimension. When the stored signals are read out later and combined with specific phase shifts, the result is similar as if the recorded data had been gathered by an equally long and shaped phased array.

The core of the SAR technique is that the distances that radar waves travel to and back from each scene element comprises some integer number of wavelengths plus some fraction of a "final" wavelength. Those fractions cause differences between the phases of the re-radiation received at various SAR or array positions. Coherent detection is used to capture the signal phase information in addition to the signal amplitude information. That type of detection requires finding the differences between the phases of the received signals and the simultaneous phase of a sample of the transmitted illumination.

In a typical SAR application, a single radar antenna is attached to an aircraft or spacecraft so as to radiate a beam whose wave-propagation direction has a substantial component perpendicular to the flight-path direction. The beam is allowed to be broad in the vertical direction so it will illuminate the terrain from nearly beneath the aircraft out toward the horizon.

Resolution in the range dimension of the image is accomplished by creating pulses which define short time intervals, either by emitting short pulses comprises a carrier frequency and sidebands, all within a certain bandwidth, or by using longer "chirp pulses" in which frequency varies, (often linearly), with time within that bandwidth. The differing times at which echoes return allow points at different distances to be distinguished.

The process can be thought of as combining the series of spatially distributed observations as if all had been made simultaneously with an antenna as long as the beam width and focused on that particular point. The "synthetic aperture" provided at maximum system range by this process not only is longer than the real antenna, but, in practical applications, it is much longer than the radar aircraft.

Combining the series of observations requires significant computational resources, usually using Fourier transform techniques. The high digital computing speed now available allows such processing to be done in near-real time on board a SAR aircraft. The result is a map of radar reflectivity, including both amplitude and phase. The amplitude information, when shown in a map-like display, gives information about ground cover in much the same way that a black-and-white photo does.

The two dimensions of a radar image are range and cross-range. Other terms used instead of cross-range are Doppler, azimuth, side etc. A regular Synthetic Aperture Radar transforms a 3D world into a 2D representation. The 2D representation exhibits cylinder symmetry at the imaging. Accordingly, it is not possible to discriminate objects having the same distance to the cylinder axis, i.e., the synthetic aperture, if they have the same position along the axis. The cylinder coordinates can be explained as the measuring coordinates in SAR. Cone coordinates can also be used (for example range and Doppler).

It takes some time and training getting used in order to correctly interpret SAR images. To assist in that, large collections of significant target signatures have been accumulated by performing many test flights over known terrains.

"Correction of Positional Errors and Geometric Distortions in Topographic Maps and DEMs Using a Rigorous SAR Simulation Technique", photogrammetric engineering & remote sensing, september 2004, pages 1031-1042, relates to detection and correction of positional errors and geometric distorsions in topographic data based on Synthetic Aperture Radar, SAR, image simulation and mathematical modelling of SAR imaging geometry.

BRIEF SUMMARY

One object of the present disclosure is to facilitate training of interpretation of SAR images.

This has in one embodiment been achieved by means of a method for rendering a simulated Synthetic Aperture Radar, SAR, image. The method comprises providing a digital surface model or the like comprising 3D coordinate data in a geo-referenced coordinate system, determining a sub-section of the digital surface model, and obtaining the simulated SAR image based on the subsection of the digital surface model, wherein substantially each point in the simulated SAR image being associated to a 3D coordinate in the geo-referenced coordinate system.

Thus, the simulated SAR images can be formed based on a model of a real environment can be obtained for training purposes. Accordingly, realistic training can be achieved.

The determination of the sub-section of the digital surface model is in one option based on a geo-referenced coordinate data input.

The real world simulated can therefore be controlled by an operator, for example a training exercise supervisor.

In one option, the geo-referenced coordinate data input is continuously updated.

Thus, for example a pilot of an aircraft or an operator of an Unmanned Aerial Vehicle, UAV, can be trained in realistic scenarios in the real world. The continuously updated geo-referenced coordinate data input can be made to simulate the path of the aerial vehicle. The method can be implemented in a flight simulator.

In one option, the step of obtaining the simulated SAR image comprises performing transformation of the subsection of the digital surface model.

In one option, the step of obtaining the simulated SAR image comprises simulating back-scatter in the digital surface model from the simulated aperture and obtaining the simulated SAR image based on a distribution of the simulated back-scatter.

In one option, the method further comprises steps of obtaining a sensor image, matching the sensor image and the simulated SAR image, and transferring for at least one of the points in the simulated SAR image the associated coordinate in the geo-referenced coordinate system to a corresponding point in the sensor image. Matching of two images is also known as image registration.

In one option, at least a subset of the 3D coordinates of the digital surface model are associated to an attribute such as colour information. The step of matching the sensor image and the simulated SAR image is in one example then based on the attribute.

In one option, the determination of the sub-section of the digital surface model is performed based on an estimation of a position of a sensor capturing the sensor image and preferably an estimated vector to the ground.

In one option, the method further comprises a step of estimating the position of the sensor and preferably the vector to the ground, wherein the estimation is based on position related information from a GPS receiver and/or inertial navigation system.

In one option, the method further comprises a step of comparing the matched simulated SAR image and the SAR image to determine at least one difference value.

One advantage is that the method can be used for surveillance purposes, wherein it is desired to access knowledge about changes in an area. Identified differences between the SAR image and the simulated SAR image can then be used for accessing the knowledge about the changes and the geo-referenced coordinate information for can be used for locating the changes for example in the sensor image.

One embodiment of the present disclosure relates to software for executing the steps of the method for rendering a simulated Synthetic Aperture Radar, SAR, image, according to the above.

The present disclosure further relates to a system for rendering a simulated Synthetic Aperture Radar, SAR, image. The system comprises a digital surface model store arranged to store a digital surface model or the like comprising 3D coordinate data in a geo-referenced coordinate system, and a first processing element arranged to obtain the simulated SAR image based on a subsection of the digital surface model, wherein substantially each point in the simulated SAR image is associated to a coordinate in the geo-referenced coordinate system.

In one option, the system further comprises a presentation unit arranged to present information related to the simulated SAR image.

In one option, the system further comprises a user interface arranged to receive user input identifying the subsection of the digital surface model.

In one option, the user interface is arranged to receive user input related to an imagined position or track of the simulated SAR.

In one option, the imagined position or track of the simulated SAR is given in the geo-referenced coordinate system.

In one option, the first processing element is arranged to simulate back-scatter in the digital surface model from the simulated aperture and to determine the simulated SAR image based on a distribution of the simulated back-scatter.

In one option, the system further comprises a sensor 1066 arranged to obtain a SAR image, a second processing element arranged to match the sensor image and the simulated SAR image, and a third processing element arranged to transfer, for at least one of the points in the simulated SAR image, the associated coordinate in the geo-referenced coordinate system to a corresponding point in the sensor image.

In one option, the digital surface model store is arranged to store for at least a subset of the 3D coordinates of the digital surface model, at least one attribute such as colour information associated to the corresponding 3D coordinate. In accordance with this option, the second processing element is arranged to match the sensor image and the simulated SAR image based on the attribute.

In one option, the system further comprises a fourth processing element arranged to compare the matched simulated SAR image and the SAR image and to determine at least one difference value based on the comparison.

One embodiment of the present disclosure relates to a training system comprising a system for rendering a Synthetic Aperture Radar, SAR, image according to the above.

One embodiment of the present disclosure relates to a flight simulator comprising a system for rendering a Synthetic Aperture Radar, SAR, image according to the above.

One embodiment of the present disclosure relates to an image interpretation system comprising a system for rendering a Synthetic Aperture Radar, SAR, image according to the above.

DETAILED DESCRIPTION OF VARIOUS EMBODIMENTS

Figure 1:
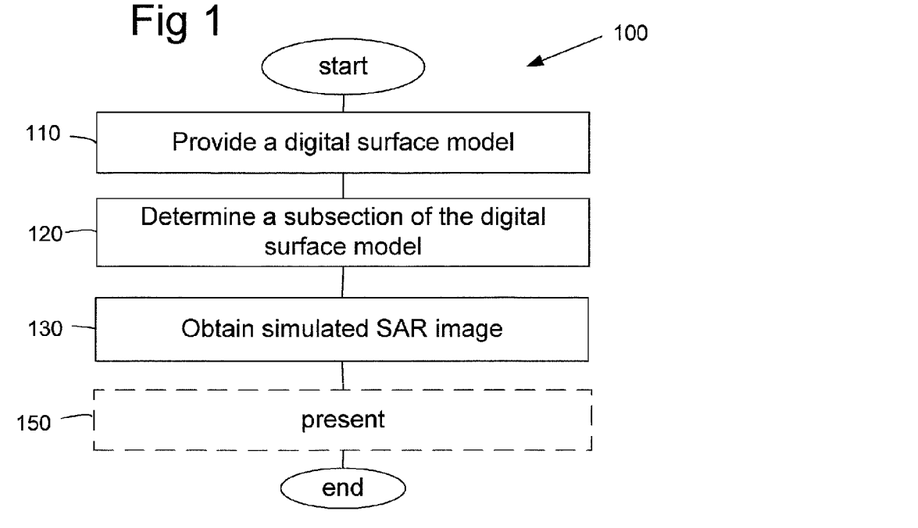
FIG. 1 is a flow chart illustrating one example of a method for rendering a Synthetic Aperture Radar, SAR, image.

In FIG. 1, a method 100 for rendering a simulated Synthetic Aperture Radar, SAR, image is illustrated. In the illustrated method, the SAR image is rendered based on a digital surface model or the like comprising 3D coordinate data in a geo-referenced coordinate system. Thus, the simulated SAR image is rendered based on a pre-stored digital surface model. In the example of FIG. 1, the method 100 for rendering a Synthetic Aperture Radar, SAR, image, comprises steps of providing 110 a digital surface model or the like comprising 3D coordinate data in a geo-referenced coordinate system, determining 120 a sub-section of the digital surface model, and obtaining 130 a simulated SAR image based on the sub-section of the digital surface model, wherein substantially each point in the simulated SAR image being associated to a 3D coordinate in the geo-referenced coordinate system. Information related to the obtained simulated SAR image provided is in one example presented 150. In one example, the simulated SAR image is presented by means of a display.

In one example, the digital surface model is a 3D map of the environment. In one example the digital surface model is a 3D model of the environment. The 3D model could be any kind of 3D model known to those skilled in the art. In one example, the 3D model is represented as a mesh. In another example the 3D model is represented as a surface representation. In another example the 3D model is represented as a voxel representation. In one example the 3D model includes texture information. In one example the 3D model is a point cloud. In one example the 3D reference data in the geo-referenced coordinate system is represented in such a way that a 3D model or a 3D map of the environment can be constructed based on the 3D reference data. In one example digital surface model is a triangular irregular network (tin)-based mesh draped with textures.

In one example, the determination 120 of the sub-section of the digital surface model is made based on a geo-referenced coordinate data input. The geo-referenced coordinate data input may be continuously updated. In one example, wherein the method is performed at a real or simulated moving object, such as an aerial object, the determination of the subsection of the digital surface model is performed based on an estimation of a position of a sensor capturing the sensor image and preferably an estimated vector to the ground.

In one example, the obtaining 130 of the simulated SAR image comprises transforming depth data of the sub-section of the digital surface model to a SAR-image view, in which pixels or points per area are counted so as to create an intensity map. A more detailed description of examples for obtaining the simulated SAR image will be described n relation to FIG. 9.

The simulated SAR image provided according to this method can be used in many applications. In one example, the simulated SAR is used for matching against other data such as SAR images. Thereby, changes in the environment between a timing of capturing the data used for obtaining the digital surface model and the timing of capturing the other data. In one example, errors can be estimated in the matching against other data. Further the obtained SAR images can be used for example for training purposes such as in a flight simulator etc.

Figure 2:
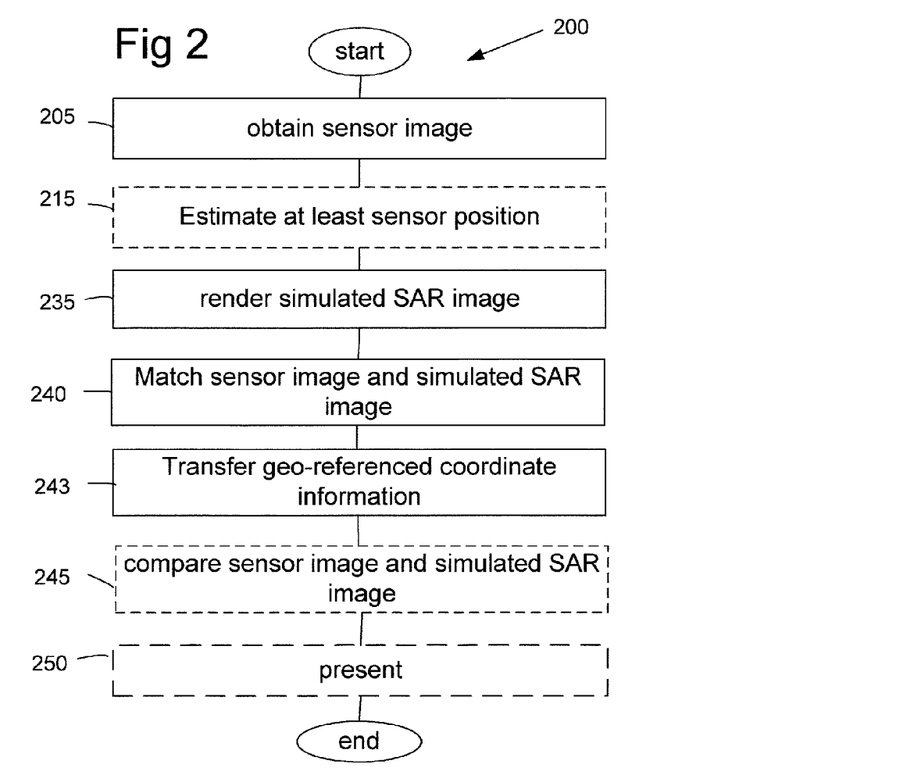
FIG. 2 is a flow chart illustrating one example of a method for providing information related to a Synthetic Aperture Radar, SAR, image.

In FIG. 2, a method for providing information related to rendering information related to a Synthetic Aperture Radar, SAR, image, is illustrated. The method comprises steps of obtaining 205 a sensor image, a step of rendering 235 a simulated sensor image, and a step of matching 240 the sensor image and the simulated sensor image. The sensor image is in one preferred example a SAR image. The simulated sensor image is in one preferred example a simulated SAR image.

The step of obtaining 205 a sensor image comprises in one example obtaining a Synthesized Aperture Radar, SAR, image.

In one example, a step of estimating 215 at least sensor position for use in the rendering 235 of the simulated SAR image is in one example performed. The at least one sensor position is then used in determining the subsection of the digital surface mode. In one example, the determination of the sub-section of the digital surface model is performed based on an estimation of the position of the sensor capturing the sensor image and an estimated vector to the ground. The step of estimating 215 the at least sensor position comprises then estimating the sensor position and the vector to the ground. In one example, the estimation is based on position related information from a GPS receiver and/or inertial navigation system.

The step of rendering 235 a simulated sensor image is in one example performed as described in relation to steps 110, 120 and 130 in FIG. 1.

The matching 240 may involve any matching method known in the art for matching of two images. The matching 240 involves in one example transforming, positioning and rotating the simulated SAR image in the sensor image. The matching may involve changing intrinsic parameters such as the position and/or direction and/or length of the aperture. The matching may involve matching texture information of the sensor image with texture information related to the simulated SAR image. The matching 240 of the sensor image with the simulated SAR image generates geo-referencing information to the sensor image. In one example wherein least a subset of the 3D coordinate data of the digital surface model are associated to at least one attribute such as colour information, the step of matching 240 the sensor image and the simulated SAR image is based on this at least one attribute.

In a detailed example, the matching 240 is performed using an error model, having six free parameters. These parameters comprise aperture position (three dimensions), direction (two dimensions) and length (one dimension). Five of these parameters do not change range and Doppler in a SAR image. The length changes the Doppler values for the image. Thus, it is possible to move the aperture without changing the image data. In a rigorous matching, a simulated SAR image would be rendered for all of these imaginable variants of these six parameters. That variant which gives the best matching against the SAR image will provide best estimation of the parameters. In a simplified method, it is assumed that the transformations appearing when the aperture is moved, are locally present as translations. Then, the six free parameters are estimated a plurality of local translation measurements.

In one example, the sensor image and the simulated SAR image are compared 245 to determine at least one difference value. The at least one difference value relates to a difference between the matched sensor image and simulated SAR image. Based on this difference, changes in the environment can be detected between the timing of capturing the sensor image and the timing of capturing the images which have been used for building the 3D model which in turn was used for forming the simulated SAR image.

In one example, identified differences are related to specific parts of the sensor image identified by the three dimensional geo-referenced coordinate data. In one example the comparison comprises calculating a correlation between the two images. In one example calculating a correlation between the two images comprises calculating a cross-correlation between the two images, preferably a normalised cross-correlation. Thereby, an indication is provided about how well the two images match each other. In one example a values is calculated representing the degree of matching. In one example calculating the value comprises using one or more convolution calculations. In one example the value is a scalar. In another example the value is a higher-dimensional object. In one example the value is the normalised cross-correlation. The normalised cross correlation can then take a value between zero and one, where zero corresponds to no match at all between the two images and one stands for full correspondence between the two images. If the sensor image fully corresponds to the simulated SAR image, it can be assume that here is a true correspondence between the sensor image and the simulated sensor image. If the images do not fully correspond, one can, for example, take the value of the normalised cross-correlation as a measure of how well the two images correspond to each other. The higher the value is, the better the correspondence. The method continues with step 150.

In one example, information related to the sensor image is presented 250. The information presented may comprise geo-referencing information related to the sensor image. For example, the presentation may comprise displaying coordinates wherein a difference has been detected between the sensor image and the simulated SAR image. In one example, the geo-referenced coordinates are displayed on one geo-referenced image which has been used for building the geo-referenced 3D model or on the sensor image. The information related to the sensor image may also comprise information describing the identified difference.

Figure 3:
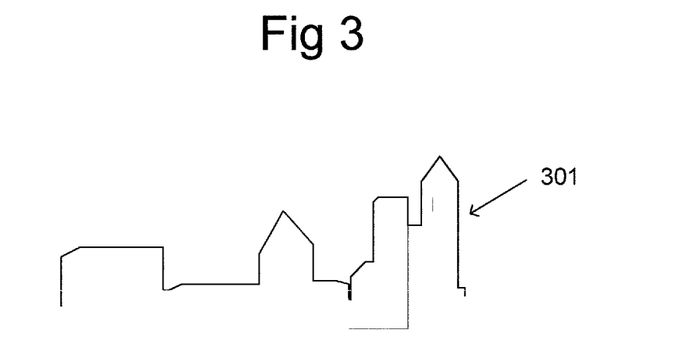
FIG. 3 is a side view illustrating a digital surface model comprising 3D coordinate data.

In FIG. 3, a digital surface model 301 or the like is illustrated comprising coordinate data in a geo-referenced coordinate system. The digital surface model 301 may comprise texture information. The digital surface model 301 may comprise substantially all visible surfaces, above a certain size, in the surrounding seen from any angle. Thus, substantially all surfaces in the surrounding exceeding a certain size are associated to 3D coordinate data given in the geo-referenced coordinate system. Further, also a attribute such as texture data may be associated to all surfaces in the surrounding exceeding a certain size. The geo-referenced coordinate data may comprise latitude data, longitude data and height data and may be associated to texture information.

Figure 4:
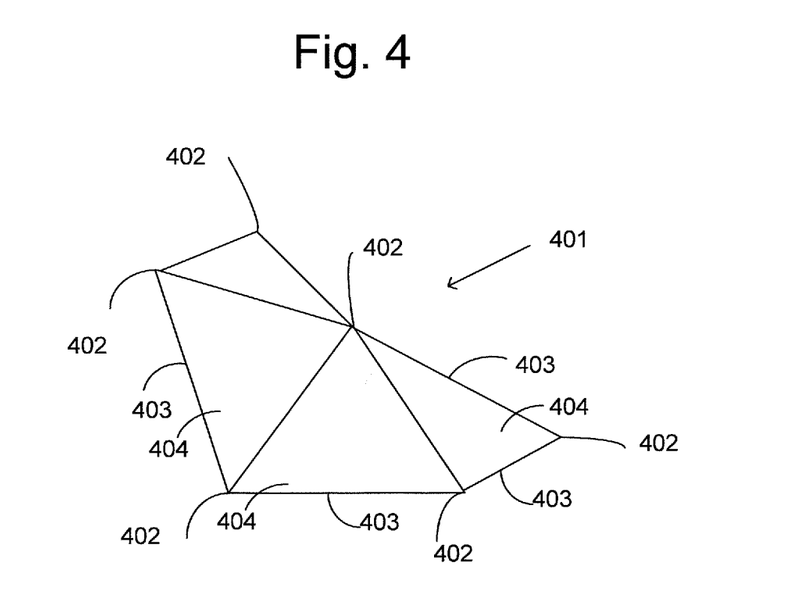
FIG. 4 illustrates schematically an example of the structure of a digital surface model formed as a mesh for describing an environment.

In the example of FIG. 4, a digital surface model 401 for describing an environment is formed as a mesh. The mesh comprises a plurality of nodes 402 interconnected by means of edges 403. Surfaces 404 are provided boarded by the edges of the mesh. The nodes are each associated to a 3D coordinate in a geographical coordinate system. The surfaces are in one example each associated to an attribute such as texture information. In one example, the surfaces are also each associated to 3D coordinate data in the geographical coordinate system. Further, a positional or mesh uncertainty may be is associated to at least some of the nodes/surfaces/edges of the mesh. The mesh uncertainty associated to each respective node/surface/edge represents the uncertainty at that specific point of the model.

In one example, the forming of the mesh comprises dividing the environment into a plurality of areas or points, providing for each area or point a plurality of geo-referenced image sets, wherein each image comprises the area or point, performing for each area or point image stereo processing on each image set so as to provide a plurality of 3D sub models for that area or point, providing the 3D model for each area or point based on the plurality of 3D sub-models and forming a composed 3D model of the environment based on the 3D models related to the different areas or points. The digital surface model 401 is then textured based on the geo-referenced images.

FIGS. 5-8 illustrate principles for performing transformation of a subsection of a digital surface model of an environment to obtain a simulated Synthetic Aperture Radar, SAR, image of the subsection of the digital surface model. The simulated SAR image simulates the function of a SAR. The SAR is a coherent mostly airborne or space borne side looking radar system. The radar system utilizes the flight path of the platform to simulate a large antenna or aperture electronically. Thus, SAR is a technique for obtaining radar images with high resolution at long distances using a small antenna, wherein a large antenna is formed by moving the small antenna along an imagined large antenna. Received data is signal processed to form the SAR image from the received data. A platform in the form of an airborne vehicle has a flight path. Objects or a terrain in a digital surface model are simulated to be hit by an imagined radar beam or pulse from a SAR. The simulated SAR produces a simulated SAR image 609 based on the location of the airborne vehicle and based on the digital surface mode. Every simulated SAR pixel, or resolution cell, in the simulated SAR image 609 is associated to a geographical location. The simulated SAR image is obtained based on a section 607 of the flight path defining a length of the synthetic aperture. Thus, imagined backscattered echoes from transmitted radar pulses or beams are determined. As the platform in the form of the airborne vehicle is simulated to continue to move forward, all imagined echoes are determined during the entire time that the digital surface model is within the imagined pulse or beam. The point at which the digital elevation model leaves the view of the imagined antenna beamwidth determines the length of the simulated or synthesized antenna.

Figure 5:
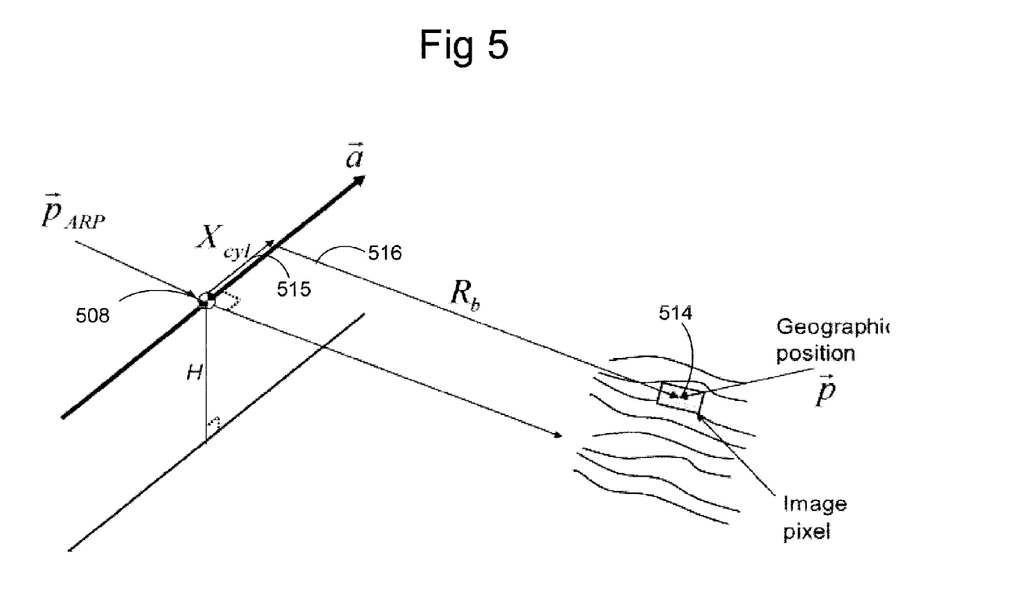
FIG. 5 illustrates schematically a cylindrical coordinate system of a simulated SAR image.
Figure 6:
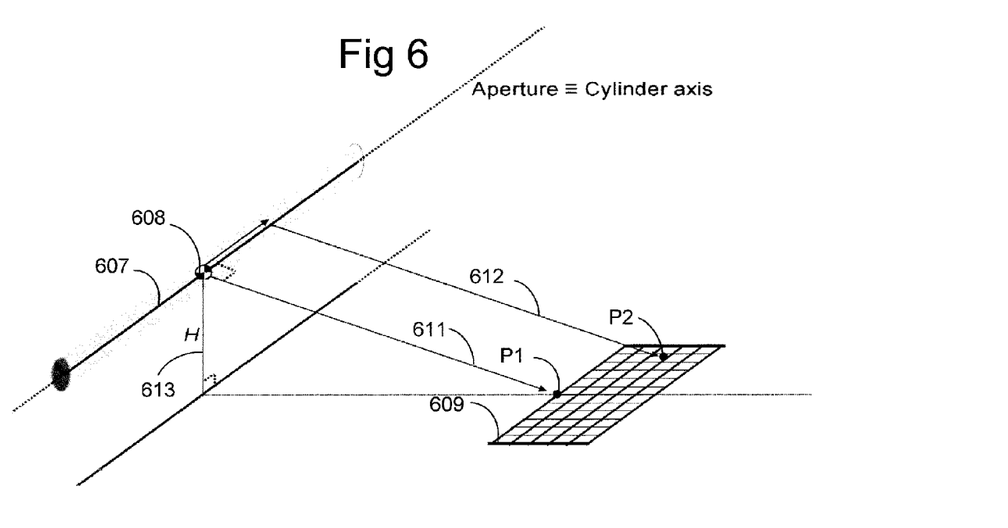
FIG. 6 illustrates schematically one example of a simulated SAR operating in a cylindrical coordinate system.

In the illustrated example of FIGS. 5 and 6, the simulated SAR is illustrated as broadside ("true strip map") SAR image. However, the principles illustrated herein are applicable also to other types of SAR images such as squint simulated SAR images. Generally, in order to simulate SAR, individual cycles for transmittal/reception of imagined radar pulses are determined and stored. Signal processing uses magnitude and phase of the imagined received signals over successive pulses from elements of the simulated synthetic aperture. The stored data is recombined to create a SAR image of the terrain as defined by the digital surface model being imagined to be flown over.

The simulated SAR produces a simulated SAR image 609 based on the location of an airborne vehicle and based on a digital surface model. Every simulated SAR pixel, or resolution cell, in the simulated SAR image 609 is associated to a geographical location. The simulated SAR image is obtained based on a length 607 of the flight path defining a length of the synthetic aperture. As the platform in the form of the airborne vehicle continues to move forward, all imagined echoes are recorded during the entire time that the digital surface model is within the imagined pulse or beam. The point at which the digital elevation model leaves the view of the imagined antenna beamwidth determines the length 607 of the simulated or synthesized antenna.

Further, for illustrative purposes, an Aperture Reference Point, ARP, 508, 608 is defined in FIGS. 5 and 6. The Aperture Reference Point forms an imagined lens of the simulated aperture. The Aperture Reference Point 508, 608 is located along the length of the synthetic aperture. The Aperture Reference Point 508, 508, 608 is located at a height H 613. Further, lines 611 and 612 illustrate a general vector from the respective position of the ARP to any point in the image/on the ground.

Thus, the simulated SAR produces a simulated SAR image 609 based on the location of an airborne vehicle and based on a digital surface model. Every simulated SAR pixel, or resolution cell, in the simulated SAR image 609 is associated to a geographical location. The simulated SAR image is obtained based on the length 607 of the flight path defining a length of the synthetic aperture.

The simulated SAR image projects the digital surface model, representing a three dimensional scene, to cylinder coordinates. Thus, each point in the digital surface model section is projected to a cylinder axis coordinate along the length 607 of the simulated SAR image. Thus, each point in the digital surface model is projected to a corresponding point in the SAR image. In the SAR image a first axis represent a slant range corresponding to a distance to the ARP 608 and the second axis represents an angle between the current position of the ARP 608 and the radiated point of the digital surface model. Further, each point in the digital surface model section is projected to a coordinate representative of a distance to the cylinder axis.

Even though the obtaining of the SAR image has been illustrated in relation to a cylindrical coordinate system, another SAR image coordinate system could be user, such a conical coordinate system.

Figure 7:
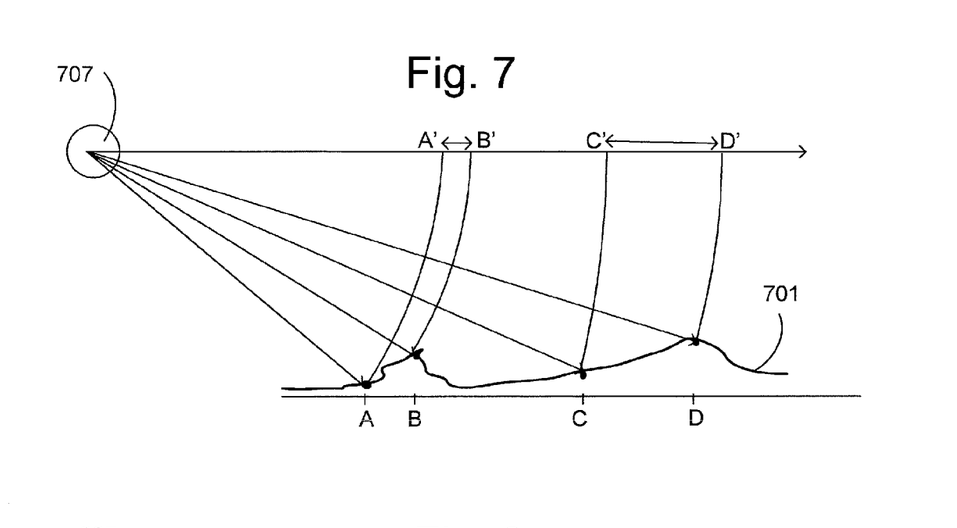
FIG. 7 is a side view illustrating the principle of simulating SAR according to a first example.

In FIG. 7, an effect of foreshortening in the simulated SAR image is illustrated. The foreshortening appears due to the fact that the SAR-imaging involves a cylinder transformation. Foreshortening occurs when a simulated radar beam or simulated radar pulses from a SAR 607 reaches the base of a tall feature in the 3D model 701 tilted towards the imagined radar before it reaches the top. Because the imagined radar measures distance in slant-range, a slope from point A to point B will appear compressed. The length of the slope will be represented incorrectly as A' to B' at the image plane of the sensor. For a less steep slope from point C to point D the length will appear less compressed. The length of the slope will then be represented as C' to D' at the image plane of the sensor.

Figure 8:
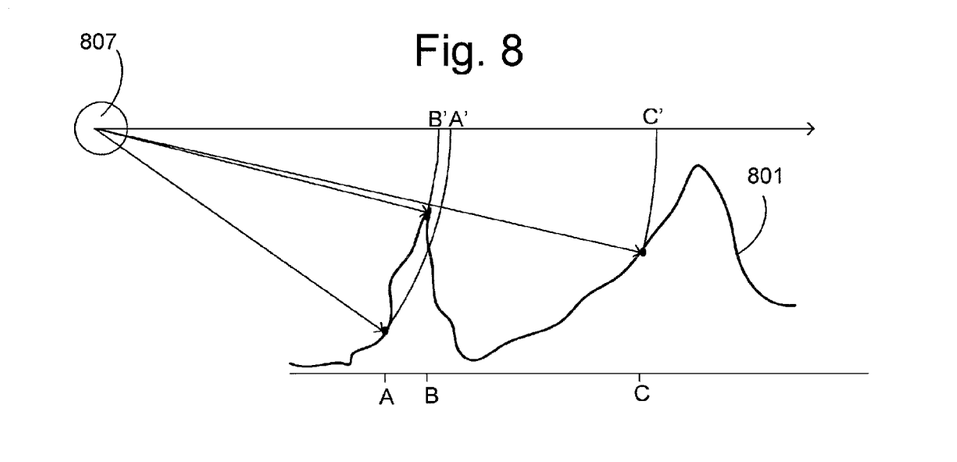
FIG. 8 is a side view illustrating the principle of simulating SAR according to a second example.

In FIG. 8, an effect of layover in the simulated SAR image is illustrated. The layover appears due to the fact that the SAR-imaging involves a cylinder transformation. Layover occurs when radar beams from a simulated SAR 807 reaches the top of a tall feature B in the 3D model 801 before it reaches the base A. The return signal from the top of the feature will be received before the signal from the bottom. As a result, the top of the feature is displaced towards the imagined radar from its true position on the ground, and "lays over" the base of the feature B' to A'. Further, a shadowing effect is illustrated in FIG. 8. The shadowing effect increases with greater incident angle.

Figure 9:
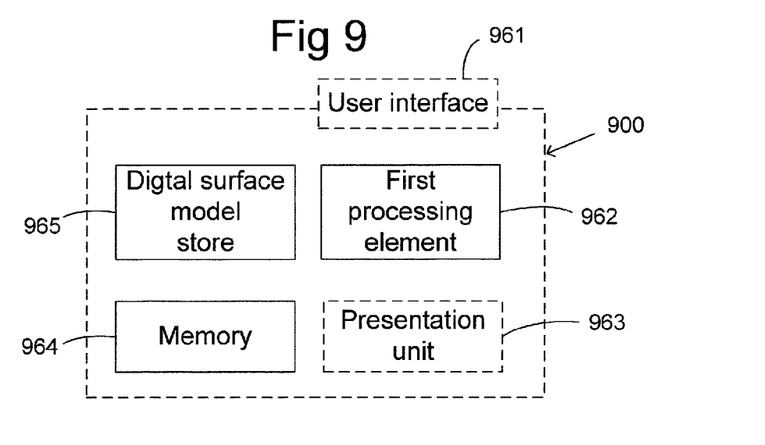
FIG. 9 shows a first example of a system for rendering a Synthetic Aperture Radar.

In FIG. 9, a system 900 for rendering a Synthetic Aperture Radar, SAR, image is illustrated, which system is arranged to obtain a simulated SAR image based on a subsection of the digital surface mode. The system 900 comprises a digital surface model store 965 a digital surface model data in a geo-referenced coordinate system and a first processing element 962. The first processing element 962 is arranged to obtain the simulated SAR image based on a subsection of the digital surface model, wherein substantially each point the simulated SAR image is associated to a coordinate in the geo-referenced coordinate system. A presentation unit 963 is in the illustrated example arranged to present information related to the simulated Synthetic Aperture Radar image.

In the illustrated example, a user interface 961 is arranged to receive input information identifying the subsection of the digital surface the model. The input information identifying the subsection of the digital surface model is fed to the first processing element 962. In one example, the input information identifies an imagined position or track of the simulated SAR. The imagined position or track of the simulated SAR may be given in the geo-referenced coordinate system. In a preferred example, the input information is user input information.

In one example, the first processing element 962 is arranged to obtain the simulated Synthetic Aperture Radar, SAR, image of the subsection of the digital surface model based on simulated back-scatter in the digital surface model from the simulated aperture and to determine the simulated SAR image based on a distribution of the simulated back-scatter. In one example, this is performed transforming depth buffer pixels to a SAR-image view wherein pixels per area are counted so as to create an intensity map transformation of a subsection of the digital surface model to provide the simulated Synthetic Aperture Radar image of the subsection of the 3D reference data.

In one example, the presentation unit 963 arranged to present information related to the simulated Synthetic Aperture Radar image is a display.

In one example, the system for rendering a Synthetic Aperture Radar, SAR, image is implemented in a training system. In one example, the system for rendering a Synthetic Aperture Radar, SAR, image is implemented in a flight simulator. Thus, the simulated SAR images formed based on a model of a real environment are used for training purposes. Accordingly, realistic training can be achieved. The real world simulated can be controlled by an operator, for example a training exercise supervisor. Further, for example a pilot of an aircraft or an operator of an Unmanned Aerial Vehicle, UAV, can be trained in realistic scenarios in the real world. Continuously updated geo-referenced coordinate data input can be made to simulate the path of the aerial vehicle. The method can be implemented in a flight simulator.

The system further comprises a memory 964. The memory is arranged to store for example software instructions for rendering the SAR image.

Figure 10:
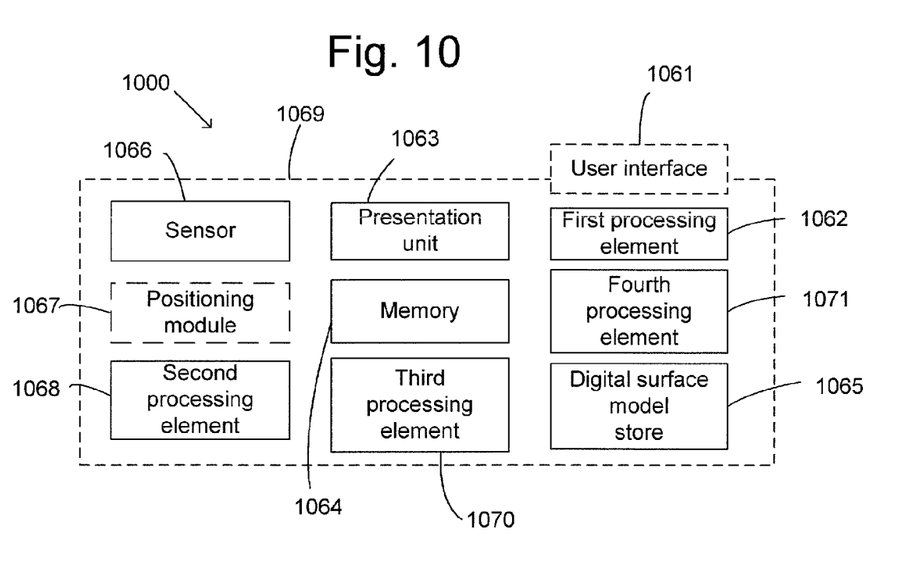
FIG. 10 shows a second example of a system for rendering a Synthetic Aperture Radar.

In FIG. 10, a system 1000 for rendering a Synthetic Aperture Radar, SAR, image is illustrated, which system is arranged to, for at least one point in a simulated SAR image, transfer a coordinate in the geo-referenced coordinate system associated to that point, to a corresponding point in the sensor image. The system comprises a digital surface model store 1065 comprising digital surface model data in a geo-referenced coordinate system and a first processing element 1062.

The first processing element 1062 is arranged to obtain the simulated SAR image based on a subsection of the digital surface model, wherein substantially each point the simulated SAR image is associated to a coordinate in the geo-referenced coordinate system.

The system 1000 comprises a sensor carrier 1069 carrying an image sensor 1066. In detail, an object forming a sensor carrier 1069 or a sensor carrying platform is moving in a terrain. The object may be an aerial object. In one example, the aerial object is an aerial vehicle. The object may also be for example land based. The object may be a person or an animal.

The sensor 1066 is arranged to obtain a sensor image of a scene. The sensor 1066 is in one example a Synthetic Aperture Radar sensor.

The sensor carrier 1069 may also comprise a positioning module 1067. The positioning module 1067 may comprise equipment for determining the position of the sensor carrier 1069 in a geo-referenced coordinate system. The equipment for determining the position of the sensor carrier 1069 comprises for example a GPS receiver and/or an inertial navigation system. The inertial navigation system may comprise at least one accelerometer and/or at least one gyro. The positioning module 1067 may also comprise equipment for determining a pointing direction of the sensor(s) 1066. Determining the pointing direction of a sensor is well known in the art and may be based on information from for example accelerometers and/or gyros. In one example, the positioning module comprises a user input module (not shown) for manual input of information related to the position of the sensor carrier and or the pointing direction of the sensor. The directing of the radar antenna is not of critical importance in SAR. It is of higher importance to measure the synthetic aperture with an accuracy determined by the wavelength. A realistic aperture is not linear; in fact it turns somewhat due to turbulence etc.

The first processing element 1062 is arranged to receive information from the positioning module 1067 related to the position of the sensor carrier 1069 and possibly also the pointing direction of the sensor(s) 1066 carried by the sensor carrier. As described above, the first processing element 1068 has access to a digital surface model of the environment. In the illustrated example, the digital surface model is stored in a memory 1065. In one example, the digital surface model is at least partly stored in a memory at a remote location. The first processing element 1062 has access to those parts of the digital surface model via a communication channel.

The digital surface model store 1065 comprises in one example coordinate data given in a geo-referenced coordinate system. The digital surface model store 1065 may further comprise information related to an attribute such as texture information. The digital surface model store is in one example arranged to store information related to substantially all visible surfaces (above a certain size) in the surrounding seen from any angle. Thus, substantially all surfaces in the surrounding exceeding a certain size are associated to 3D coordinate data given in the geo-referenced coordinate system. Further, also texture data may be associated to all surfaces in the surrounding exceeding a certain size. The geo-referenced coordinate data may comprise latitude data, longitude data and height data and may be associated to texture information. A detailed example of a digital surface model is described in relation to FIGS. 3 and 4.

The first processing element 1062 is arranged to extract from the digital surface model data based on information provided from the positioning module 1067. As is described above, the information from the positioning module comprises position information and possibly also information related to a moving direction of the sensor carrier 1069 and/or a pointing direction of the sensor 1066. The first processing element 1062 is arranged to select the data such that it is ensured that it encompasses the scene seen by the sensor 1062. Thus, the subsection of the digital surface model may be selected based on an uncertainty of the data from the positioning module 1067. The first processing element is as described above arranged to obtain the simulated SAR image based on a subsection of the digital surface model, wherein substantially each point in the simulated SAR is associated to a coordinate in the geo-referenced coordinate system.

A second processing element 1068 is arranged to match the sensor image and the simulated SAR image obtained by the first processing element. The processing involves matching SAR image with the simulated SAR image as determined based on the subsection of the digital surface model to map the SAR image onto the simulated SAR image. The matching involves in one example transforming, positioning and rotating the simulated SAR image in the sensor image. The matching may involve changing parameters such as position and/or direction and/or length of the apertude in relation to the scene center. In one example wherein least a subset of the 3D coordinate data of the digital surface model are associated to an attribute such as colour information, the second processing element is arranged to match the sensor image and the simulated SAR image based on the attribute.

In one example, the second processing element 1068 is further arranged to determine a measure related to an uncertainty in the matching between the SAR image and the simulated SAR image and thus in the geo-coded information associated to the SAR image as a result of the matching. The measure related to the uncertainty in the matching is one example determined for the SAR image as a whole. In an alternative or complementary example, the measure related to an uncertainty is provided for each of at least one point in the SAR image.

In one example, the measure related to the uncertainty in the matching is determined as a distance value. In one example, the measure related to the uncertainty in the matching is determined as a percentage.

The matching of the sensor image with the simulated SAR image generates geo-referencing information to the sensor image. A third processing element 1070 is arranged to transfer, for at least one of the points in the simulated SAR image, the associated coordinate in the geo-referenced coordinate system to a corresponding point in the sensor image.

A fourth processing element 1071 is in the illustrated example arranged to compare the matched simulated SAR image and the SAR image and to determine at least one difference value based on the comparison. Thus, the fourth processing element 1071 may further be arranged to identify discrepancies between the simulated SAR image and the information in the SAR image. The discrepancy relates characteristically to that something has changed on the ground between the simulated SAR image and the information in the SAR image. The change may related to addition and/or removal of at least one object in the SAR image in relation to the corresponding simulated SAR image. The change may instead or in addition thereto related to a difference in shape and/or size of at least one object in the SAR image in relation to the corresponding simulated SAR image.

The system 1000 may comprise a presentation unit 1063. The system may comprise a user interface 1061.

The presentation unit 1063 is arranged to present information related to the simulated Synthetic Aperture Radar image. In one example, the presentation unit 1063 is arranged to present information for decision support. In one example, the presentation unit 1063 is arranged to present information related to a the SAR image and/or the simulated SAR image and/or 3D coordinate information in the geo-referenced coordinate system related to a particular point in the simulated SAR image and/or information related to a discrepancy between the SAR image and the simulated SAR image. In one example, the presentation unit comprises a display arranged to display the SAR image and/or the simulated SAR image and/or 3D coordinate information in the geo-referenced coordinate system related to a particular point in the simulated SAR image and/or information related to a discrepancy between the SAR image and the simulated SAR image. Thus, the system can be used for surveillance purposes, wherein it is desired to access knowledge about changes in an area. Identified differences between the SAR image and the simulated SAR image can then be presented for accessing the knowledge about the changes. The geo-referenced coordinate information for locating the changes for example in the sensor image can also be presented.

The user interface 1061 may comprise for example a computer mouse or a touch screen on the display for marking a position or area in the displayed sensor image. The presentation unit 1063 is then arranged to extract coordinate information from the sensor image related to the selected position/area along with associated uncertainty measure. This coordinate information may then be used by other systems.

The system further comprises a memory 1064. The memory is arranged to store for example software instructions for rendering the SAR image and for control of the presentation unit 1063.

The first, second, third and fourth processing elements, digital surface model, the memory, the presentation unit and the user interface are in the illustrated example implemented at the sensor carrier 1069. However, at least parts of the respective processing elements and/or units of the system 1000 can be implemented elsewhere.

SAR radar is partnered by what is termed Inverse SAR, ISAR, technology which in the broadest terms, utilizes the movement of the target rather than the emitter to create the synthetic aperture. The simulated SAR described herein is also intended to include Inverse SAR.

The SAR and simulated SAR technique herein described is intended to include traditional radar and simulation of traditional radar.

The invention claimed is:

1. Method (100; 200) for rendering a simulated Synthetic Aperture Radar (SAR) image, said method comprising the steps of:
   providing (110) a digital model comprising 3D coordinate data in a geo-referenced coordinate system;
   determining (120) a sub-section of the digital model; and
   rendering (130) the simulated SAR image based on the subsection of the digital model, wherein substantially each point in the simulated SAR image being associated to a three-dimensional (3D) coordinate in the geo-referenced coordinate system.

2. Method according to claim 1, wherein the determination (120) of the sub-section of the digital model is based on a geo-referenced coordinate data input.

3. Method according to claim 1, wherein the geo-referenced coordinate data input is continuously updated.

4. Method according to claim 1, wherein the step of obtaining (130) the simulated SAR image comprises performing transformation of the subsection of the digital model.

5. Method according to claim 1, wherein the step of obtaining (130) the simulated SAR image comprises:
   simulating back-scatter in the digital model from the simulated aperture; and
   obtaining the simulated SAR image based on a distribution of the simulated back-scatter.

6. Method according to claim 1, further comprising steps of:
   obtaining (205) a sensor image;
   matching (240) the sensor image and the simulated SAR image; and
   transferring (243) for at least one of the points in the simulated SAR image the associated coordinate in the geo-referenced coordinate system to a corresponding point in the sensor image.

7. Method according to claim 6, wherein at least a subset of the 3D coordinates of the digital model are associated to an attribute and wherein the step of matching (240) the sensor image and the simulated SAR image is based on the attribute.

8. Method according to claim 6, wherein the determination (120) of the sub-section of the digital model is performed based on an estimation of a position of a sensor capturing the sensor image and an estimated vector to the ground.

9. Method according to claim 6, further comprising a step of estimating (215) the position of the sensor and the estimated vector to the ground, wherein the estimation is based on position related information from a GPS receiver and/or inertial navigation system.

10. Method according to claim 6, further comprising a step of comparing (245) the matched simulated SAR image and the SAR image to determine at least one difference value.

11. System (900; 1000) for rendering a simulated Synthetic Aperture Radar (SAR) image, said system comprising:
    a digital model store (965; 1065) configured to store a digital model or the like comprising three-dimensional (3D) coordinate data in a geo-referenced coordinate system; and
    a first processing element (962; 1062) configured to render the simulated SAR image based on a subsection of the digital model,
    wherein substantially each point in the simulated SAR image is associated to a coordinate in the geo-referenced coordinate system.

12. System according to claim 11, further comprising a presentation unit (963; 1063) configured to present information related to the simulated SAR image.

13. A system according to claim 11, further comprising a user interface (961; 1061) configured to receive user input identifying the subsection of the digital model.

14. A system according to claim 13, wherein the user interface (1061) is configured to receive user input related to a position or track of the simulated SAR.

15. A system according to claim 14, wherein the position or track of the simulated SAR is given in the geo-referenced coordinate system.

16. A system according to claim 11, wherein the first processing element (962; 1062) is configured to simulate back-scatter in the digital model from the simulated aperture and to determine the simulated SAR image based on a distribution of the simulated back-scatter.

17. A system according to claim 11, further comprising:
    a sensor (1066) arranged to obtain a SAR image;
    a second processing element (1068) configured to match the sensor image and the simulated SAR image; and
    a third processing element (1070) configured to transfer, for at least one of the points in the simulated SAR image, the associated coordinate in the geo-referenced coordinate system to a corresponding point in the sensor image.

18. A system according to claim 17, wherein the digital model store (1065) is arranged to store for at least a subset of the 3D coordinates of the digital model, at least one attribute associated to the corresponding 3D coordinate, and wherein the second processing element (1068) is arranged to match the sensor image and the simulated SAR image based on the attribute.

19. A system according to claim 17, further comprising a fourth processing element (1071) configured to compare the matched simulated SAR image and the SAR image and to determine at least one difference value based on the comparison.

20. Training system comprising the system (900; 1000) according to claim 11 for rendering a Synthetic Aperture Radar (SAR) image.

21. Flight simulator comprising the system (900; 1000) according to claim 11 for rendering a Synthetic Aperture Radar (SAR) image.

22. Image interpretation system comprising a training system comprising the system (900; 1000) according to claim 11 for rendering a Synthetic Aperture Radar (SAR) image.

23. A computer program product comprising at least one non-transitory computer-readable storage medium having computer-readable program code portions stored therein, the computer-readable program code portions comprising at least one executable portion configured for executing the steps of the method according to claim 1.

24. A computer program product comprising at least one non-transitory computer-readable storage medium having computer-readable program code portions stored therein, the computer-readable program code portions comprising at least one executable portion configured for operating the system according to claim 11.

* * * * *